US009218396B2

(12) United States Patent
Hamborg et al.

(10) Patent No.: US 9,218,396 B2
(45) Date of Patent: *Dec. 22, 2015

(54) INSIGHT DETERMINATION AND EXPLANATION IN MULTI-DIMENSIONAL DATA SETS

(71) Applicant: International Business Machines Corporation, Armonk, NY (US)

(72) Inventors: Felix Hamborg, Stuttgart (DE); Alexander Lang, Stuttgart (DE); Christoph Lingenfelder, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,334

(22) Filed: Mar. 25, 2014

(65) Prior Publication Data

US 2014/0258312 A1 Sep. 11, 2014

Related U.S. Application Data (63) Continuation of application No. 13/788,681, filed on Mar. 7, 2013.

(51) Int. Cl.
*G06F 17/30* (2006.01)

(52) U.S. Cl.
CPC ...... *G06F 17/3053* (2013.01); *G06F 17/30592* (2013.01)

(58) Field of Classification Search
CPC .............. G06F 17/30592; G06F 17/3053
USPC ............ 707/999.003, 999.104, 999.01, 707/999.005, 999.102, 602, 999.006, 707/E17.005, 769, E17.014, E17.109, 707/999.001, 999.002, 999.004, 999.1, 707/E17.017, E17.058, E17.084, E17.094, 707/E17.107, 714, 736, 749, 999.107, 707/E17.008, E17.009, E17.044, E17.054, 707/E17.059, E17.083, E17.108, E17.116, 707/E17.135, 600, 601, 603, 608, 661, 709, 707/711, 741, 754, 758, 759, 776, 778, 784, 707/791, 796, 802, 805, 812, 828, 917, 956, 707/999.007, 999.101, 999.103, 999.201, 707/999.202
See application file for complete search history.

(56) References Cited

U.S. PATENT DOCUMENTS

| 6,094,651 | A  | 7/2000 | Agrawal et al. |
| 6,205,447 | B1 | 3/2001 | Malloy |
| 6,366,922 | B1 | 4/2002 | Althoff |
| 7,752,162 | B2 | 7/2010 | Deshpande et al. |

(Continued)

OTHER PUBLICATIONS

U.S. Appl. No. 13/788,681, entitlted "Insight Determination and Explanation in Multi-Dimensional Data Sets", filed Date Mar. 7, 2013.
Zhou, Zhi-Hua, Introduction to Data Mining: Part 2: Data Cube and OLAP, 2012, notes, Department of Computer Science & Technology, Nanjing University, Nanjing, China.

(Continued)

*Primary Examiner* — Jay Morrison
*Assistant Examiner* — Ken Hoang
(74) *Attorney, Agent, or Firm* — Patterson & Sheridan, LLP (57) ABSTRACT

Techniques are disclosed for determining reasons underlying insights gleaned from multi-dimensional data. In one embodiment, a contingency table is accessed that represents multiple dimensions of the data, in order to identify one or more insights. One or more dimensions, other than the represented dimensions, are evaluated to identify one or more reasons underlying a first insight of the one or more insights, and the one or more reasons are output.

20 Claims, 6 Drawing Sheets

(56) References Cited

U.S. PATENT DOCUMENTS

| | | |
|---|---|---|
| 8,200,618 B2 | 6/2012 | Gibson et al. |
| 8,200,666 B2 | 6/2012 | Bartomeli et al. |
| 2006/0053136 A1 | 3/2006 | Ashiri |
| 2008/0270209 A1* | 10/2008 | Mauseth et al. .......... 705/7 |
| 2009/0119309 A1* | 5/2009 | Gibson et al. .......... 707/100 |
| 2012/0095793 A1 | 4/2012 | Averbuch |
| 2013/0231920 A1* | 9/2013 | Mathew et al. .......... 704/9 |

OTHER PUBLICATIONS

Ding, Bolin et al., Keyword Search in Text Cube: Finding Top-K Relevant Cells, 2010, <research.microsoft.com/pubs/173796/cidu10topcells.pdf>.

Jensen, Christian S. et al., Multidimensional Databases and OLAP, 2007, pp. 53-1-53-28, CRC Press, LLC, Boca Raton, United States <people.cs.aau.dk/~simas/dat5_08/papers/mdo-9.pdf>.

* cited by examiner

( BEGIN )
                    │
                    ▼
┌─────────────────────────────────────────────────────────┐
│ Access a contingency table generated based on a set of  │
│ data snippets collectively reflecting dimensions of      │
│ multi-dimensional data, each dimension having members,   │
│ each all representing a distinct combination of members  │─── 310
│ selected from a subset of different dimensions, each cell│
│ having a frequency properly characterizing a frequency   │
│ of occurrence, in the set of data snippets, of the       │
│ distinct combination represented by the respective cell, │
│ each cell further having a relevance property            │
└─────────────────────────────────────────────────────────┘
                    │
                    ▼
┌─────────────────────────────────────────────────────────┐
│ Determine one or more insights corresponding to a subset │
│ of cells in the contingency table, each insight          │
│ satisfying a relevance criterion and having a directional│─── 320
│ property specifying whether the respective insight occurs│
│ more frequently or less frequently than a statistically  │
│ expected frequency for the respective insight            │
└─────────────────────────────────────────────────────────┘
                    │
                    ▼
┌─────────────────────────────────────────────────────────┐
│ Determine a reason pertaining to a first insight, based  │
│ on the directional property of the first insight, the    │
│ reason including a member identified as characterizing a │
│ rationale underlying the first insight, the identified   │─── 330
│ member being from a dimension selected from a set        │
│ difference between the dimensions and the subset of      │
│ different dimensions represented by the first insight    │
└─────────────────────────────────────────────────────────┘
                    │
                    ▼
┌─────────────────────────────────────────────────────────┐
│ Output an indication that the identified member is       │─── 340
│ designated as the reason pertaining to the first insight │
└─────────────────────────────────────────────────────────┘
                    │
                    ▼
                ( END )
```

INSIGHT DETERMINATION AND EXPLANATION IN MULTI-DIMENSIONAL DATA SETS

CROSS-REFERENCE TO RELATED APPLICATION

This application is a continuation of co-pending U.S. patent application Ser. No. 13/788,681, filed Mar. 7, 2013. The aforementioned related patent application is herein incorporated by reference in its entirety.

BACKGROUND

1. Field of the Invention

Embodiments disclosed herein relate to multi-dimensional data processing. More specifically, embodiments disclosed herein relate to determining and explaining insights gleaned from multi-dimensional data sets.

2. Description of the Related Art

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are often made using high-level query languages such as Structured Query Language (SQL). Upon receiving such a request, the DBMS may execute the request against a corresponding database, and return any result of the execution to the requesting entity.

SUMMARY

Embodiments presented in this disclosure provide a method of reason determination for insights gleaned from multi-dimensional data, based on directional properties of the insights. The method includes determining one or more insights including a subset of cells in a contingency table. Each of the one or more insights satisfies a relevance criterion and has an associated directional property specifying whether the respective insight occurs more frequently or less frequently than a statistically expected frequency for the respective insight. The method also includes determining, based on the directional property of a first insight of the one or more insights, a reason pertaining to the first insight. The reason includes a member that is identified as characterizing a rationale underlying the first insight. An indication is output that the identified member is designated as the reason pertaining to the first insight.

Other embodiments presented in this disclosure provide a computer program product for reason determination for insights gleaned from multi-dimensional data, based on directional properties of the insights. The computer program product includes a computer-readable storage medium having program code embodied therewith. The program code is executable by one or more computer processors to determine one or more insights including a subset of cells in a contingency table. Each of the one or more insights satisfies a relevance criterion and has an associated directional property specifying whether the respective insight occurs more frequently or less frequently than a statistically expected frequency for the respective insight. The program code is also executable to determine, based on the directional property of a first insight of the one or more insights, a reason pertaining to the first insight. The reason includes a member that is identified as characterizing a rationale underlying the first insight. An indication is output that the identified member is designated as the reason pertaining to the first insight.

Still other embodiments presented in this disclosure provide a computer system for reason determination for insights gleaned from multi-dimensional data, based on directional properties of the insights. The computer system includes one or more computer processors, one or more computer-readable memories and one or more computer-readable, tangible storage devices. The computer system also includes program instructions, stored on at least one of the one or more computer-readable, tangible storage devices for execution by at least one of the one or more computer processors via at least one of the one or more computer-readable memories. The program instructions include program instructions to determine one or more insights including a subset of cells in a contingency table. Each of the one or more insights satisfies a relevance criterion and has an associated directional property specifying whether the respective insight occurs more frequently or less frequently than a statistically expected frequency for the respective insight. The program instructions also include program instructions to determine, based on the directional property of a first insight of the one or more insights, a reason pertaining to the first insight. The reason includes a member that is identified as characterizing a rationale underlying the first insight. An indication is output that the identified member is designated as the reason pertaining to the first insight.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein provide techniques for programmatically determining and explaining insights gleaned from multi-dimensional data sets. One embodiment provides an application configured to access a contingency table representing multiple dimensions of the data sets, in order to identify one or more insights. The application is further configured to evaluate members of one or more dimensions, other than the represented dimensions, to identify one or more reasons underlying a first insight of the one or more insights. The application is further configured to output the one or more reasons underlying the first insight. At least in some embodiments, the application may be dynamically configured to consider or disregard specific members and/or dimensions of the data sets. Thus, insights and underlying reasons may be identified without first requiring a complete analysis of the data sets including all of the dimensions. To improve plausibility of assertions pertaining to reasons and/or insights, a directional property of the reasons and/or insights is taken into account by the application. In some embodiments, a domain expert may specify a restricted set of members and/or dimensions for reason determination, in which case the application restricts processing to those specified members and/or dimensions. The application may also perform multiple evaluation runs, each run depending on results from a previous run. Accordingly, insights and underlying reasons may be determined more accurately, efficiently, and/or flexibly at least in some cases, especially for data sets that are vast in size and/or highly multi-dimensional.

In general, vast amounts of data may be stored in online transaction processing (OLTP) systems and other databases. For example, the data may include business data such as sales, product, and financial data. Decision-makers frequently rely on such data in making business decisions. However, unlike OLTP systems, which typically capture transaction data for a business, online analytical processing (OLAP) systems analyze the transaction data at an aggregate level to further inform decision-making. For example, a business analyst may interpret data aggregated across various business dimensions in an OLAP system. The business analyst may browse, in various contexts, data from the OLAP system. For instance, the business analyst may view sales by product by customer by time, defects by manufacturing plant by time, etc.

Generally, OLAP allows multidimensional analysis of data. That is, OLAP provides data in a form of "views" or "dimensions" that are organized to reflect a multidimensional nature of the data. An OLAP system typically includes data models that allow business analysts to interactively explore data across multiple viewpoints at multiple levels of aggregation, also referred to as levels. An increasingly popular data model for OLAP systems is a data cube (or simply, cube). An OLAP system may store a number of cubes. Each cube includes a set of dimensions (e.g., Time, Geography, Product, etc.). A dimension typically comprises many levels, and the levels are typically hierarchical (e.g., Month, Quarter, and Year for the Time dimension; City, Province, and Country for the Geography dimension, etc.).

OLAP systems typically aggregate data across various dimensions at various levels to provide different views of the data at different levels of aggregation. The data may be aggregated over various periods of time, by geography, by teams and by product, depending on the type and organization of the business. Aggregated data is commonly referred to as an aggregation. For example, an aggregation may be the sales data for the month of July for a specified product. A slice typically comprises a level from at least a subset of dimensions, and aggregations are typically associated with a slice.

Further, each dimension of a cube includes a number of members. The members of a dimension may be organized into a hierarchy by the levels of the dimension. For example, a cube may include a Geography dimension having members representing various geographic locations (e.g., Canada, France, etc.). A member representing Ottawa (existing at the City level of the hierarchy of the geography dimension) may be arranged in the hierarchy as a child member of a member representing Ontario (existing at the Province level of the hierarchy). Similarly, the member representing Ontario may, in turn, be arranged in the hierarchy as a child member of a member representing Canada (existing at the Country level of the hierarchy).

A cube may also include measures, which may be described as metrics aggregated along dimensional hierarchies of the cube. For example, a cube may include a Total Sales measure for various products over various time periods. Similarly, the cube may also include an Average Sales measure. A user may query an individual cell of the cube by identifying a member in each dimension and a measure.

Typically, business analysts issue OLAP queries to retrieve data and may request aggregations at various levels. If the aggregations are not available, then the OLAP system may compute the aggregations in real-time. Because computing aggregations may be time consuming, various OLAP systems store pre-computed aggregations to process OLAP queries more efficiently.

Examples of operations typically supported by OLAP systems include calculation and modeling applied across dimensions through hierarchies or across members, trend analysis over sequential time periods, slicing subsets for on-screen viewing of the data, drill-down to deeper levels of consolidation of the data, reach-through to underlying detail data, and rotation to new dimensional comparisons in a viewing area associated with the data. An example of an OLAP system is InfoSphere™ Warehouse Cubing Services, available from International Business Machines Corp. (IBM®) of Armonk, N.Y.

In processing an OLAP query, an OLAP server (of an OLAP system) may derive a value of a cell in a cube from data residing outside of the cubes of the OLAP system. For example, the data may reside in an underlying (relational) database. To produce a cell value, an OLAP server may analyze a cell to determine which measure and what members from other dimensions are associated with the cell. Further, if the cell value is not available (e.g., has not been precomputed, or is out of date relative to the underlying data), the OLAP server may generate a relational database query to determine the cell value from the database. The relational database query may aggregate database rows matching dimensional criteria (e.g., rows associated with a time period and product of the cell). An example of a query language for OLAP systems is Multidimensional Expressions (MDX) from Microsoft® Corp. of Redmond, Wash. An example of a query language for relational databases is Structured Query Language (SQL). For instance, in processing an MDX query against a cube, the OLAP server may generate an SQL query from dimension members and from a measure associated with a cell of the cube. As a result, the relational database aggregates only data relevant to the cell (e.g., based on constraints in a WHERE clause of the SQL statement) and returns the aggregated data to the OLAP server. In general, OLAP queries can fetch data at multiple levels of aggregation, and in one embodiment, one SQL query is generated for each distinct level of aggregated data reference by or contained in the OLAP query.

Further, the OLAP system may interact with other applications to provide users with additional functionality for analyzing and reporting data. Examples of such applications include IBM® Cognos® and SAP® Business Objects™. These applications may provide users with a variety of tools for analyzing data and building reports.

While embodiments may be described herein with reference to an application that interacts with multi-dimensional data sets stored in an OLAP system, other embodiments are broadly contemplated. For example, in one embodiment, the OLAP system itself is configured to determine and explain insights gleaned from the multi-dimensional data sets.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments presented in the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access analytic applications or associated multi-dimensional data sets available in the cloud. For example, the analytic applications could execute on a computing system in the cloud and provide access to one or more contingency tables. The one or more contingency tables may be stored at a storage location in the cloud. Doing so allows the one or more contingency tables to be accessed from any computing system attached to a network connected to the cloud (e.g., the Internet).

The flowchart and block diagrams in the Figures illustrate the architecture, functionality, and operation of possible implementations of systems, methods and computer program products according to various embodiments in the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
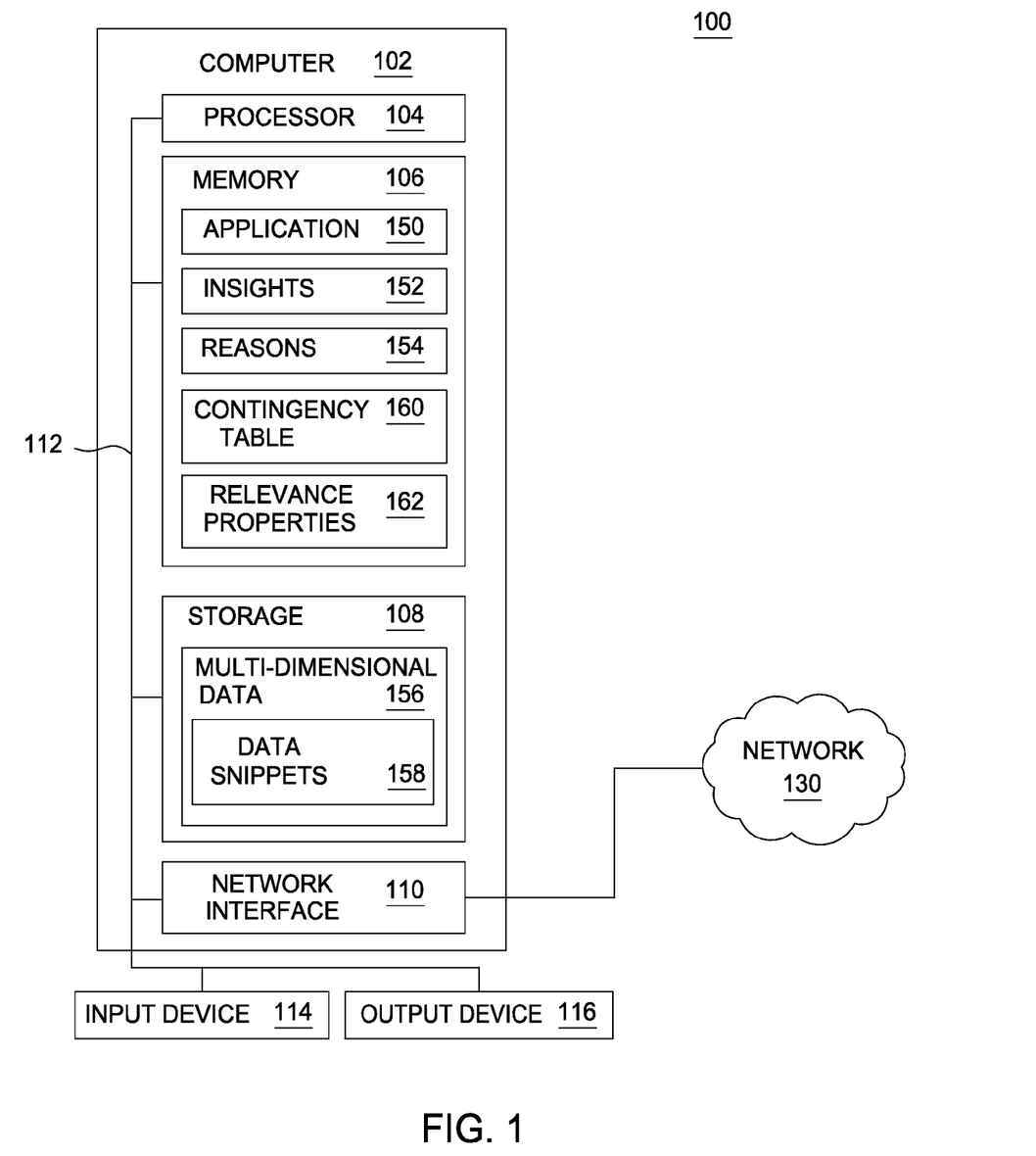
FIG. 1 is a block diagram illustrating a system for determining and explaining insights gleaned from multi-dimensional data, according to one embodiment presented in this disclosure.

FIG. 1 is a block diagram illustrating a system 100 for determining and explaining insights gleaned from multi-dimensional data, according to one embodiment presented in this disclosure. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes an application 150 configured to access a contingency table 160 having associated relevance properties 162, in order to determine insights 152 and underlying reasons 154. The contingency table 160, also referred to as a cross tab, may be generated based on data snippets 158 reflecting dimensions of multi-dimensional data 156. At least in some embodiments, the multi-dimensional data 156, the data snippets 158, the contingency table 160, the relevance properties 162, the insights 152, and/or the reasons 154 may be stored in a database serving as a data warehouse or a data mart. Further, depending on the embodiment, the database may be stored on the computer 102 or on a different computer communicably connected to the computer 102 via the network 130. Organizations may archive data in a data warehouse, which refers to a collection of data designed to support management decision-making. A given subset of the data warehouse, often specific to a given business unit, may be referred to as a data mart. Data warehouses and data marts may often be characterized by adhering to a star schema or snowflake schema, storing much larger volumes of data than is typically stored in a database, and processing queries much more complex and/or ad-hoc than is typically processed by a database.

Data records in the database may generally be maintained in the form of tables, which are a collection of records having identical columns. Each column maintains information on a particular type of data in the data records. Each table may be associated with one or more indexes. An index refers to an ordered set of pointers to records in the table based on data in one or more columns of the table. In some cases, all the information needed by a query may be found in the index, making it unnecessary to search the actual table.

Data warehouses and data marts often store a wide variety of data presenting a coherent picture of business conditions at any given point in time. One type of data warehouse schema is a multi-dimensional schema, which may be a star schema or a snowflake schema. In a star schema, information is classified into two groups: facts and dimensions. Facts refer to records pertaining to key transactions of the organization, such as sales data, purchase data, investment returns, etc., and the records are stored in a fact table. Dimensions maintain attributes about data the fact records and are stored in dimension tables. Each dimension table has a primary key column corresponding to a foreign key column in the fact table. Typically, the fact table is much larger than the related dimension tables.

The fact table often includes numerical facts, such as the date of a sale, cost, type of product sold, location, site of sale, etc. The dimension tables may provide attributes containing descriptive textual information pertaining to one of the fact table columns. For instance, a time dimension table can provide attributes on a date column in the fact table that describes the date of sale. The time dimension table may provide various weather conditions or events that occurred on particular dates.

The star schema provides a view of the database on dimension attributes that may be useful for analysis needs of the organization. Using the star schema, users may query on attributes in dimension tables based on search criteria, to locate records in the fact table. A query would qualify rows in the dimension tables that satisfy certain join conditions. The qualifying rows of the dimension tables have primary keys corresponding to foreign keys in the fact table. A join operation, such as an equijoin or a natural join, is then performed on the qualifying rows of the joined dimension tables and the fact table. This join results in returning fact table entries that match the rows of the joined dimension tables, which may also be described as fact table entries that satisfy the search criteria on the dimension tables. Accordingly, join operations may be used to query a fact table on dimension table attributes. In some embodiments where foreign keys are not explicitly defined, statistical referential integrity constraints are defined between a primary key of a dimension table and joined fact table column(s), upon determining that the join satisfies a prescribed degree of resemblance to a referential constraint.

A join operation may be used to combine or concatenate records from different dimension tables according to a condition or predicate to determine values to apply against the fact table. The join operation is distinguished from a Cartesian product, which concatenates every record from one table with every row from another table, without regard to any condition or predicate to exclude records from the result. In contrast, during a join operation, records not satisfying the predicate or condition are excluded from the result.

The Cartesian product of the records of the dimension tables provides a data view of the entire space, also referred to as Cartesian space, of every possible combination of the possible dimension table values. The join result, on the other hand, is a subset of the Cartesian space that is limited to those Cartesian space points that satisfy the join or search condition. One common type of join operation is an equijoin. An equijoin combines two rows from different tables that are equal according to a given attribute. Once the combination of all dimension table records that satisfy the search criteria is generated, the resulting records may then be applied to the fact table in an equijoin operation to locate those records in the fact table that have the same values as the rows resulting from the join on the dimension tables. Typically, the primary key columns of the dimension tables in the join result are compared against the corresponding foreign key columns in the fact table to generate the equijoin results.

In one embodiment, the query language supported by the database management system (DBMS) associated with the database is a declarative language, which specifies what data is accessed and not how that data is to be accessed. This stands in contrast to an imperative language, which explicitly specifies how the data is accessed. In one embodiment, to facilitate processing queries composed according to a declarative language, the DBMS includes a query optimizer configured to formulate different plans for accessing data and evaluate the plans to select one for execution. The plans may be evaluated based on costs and/or rules. In one embodiment, to select a least costly plan in terms of resources and/or time, the query optimizer relies on statistics maintained by the DBMS, where the statistics include information about the underlying data being accessed. For example, the statistics may include size and/or column-data distribution of tables. Using such statistics, the cost of certain operations, such as simple predicates (e.g., column=value) can be more accurately estimated.

Figure 2:
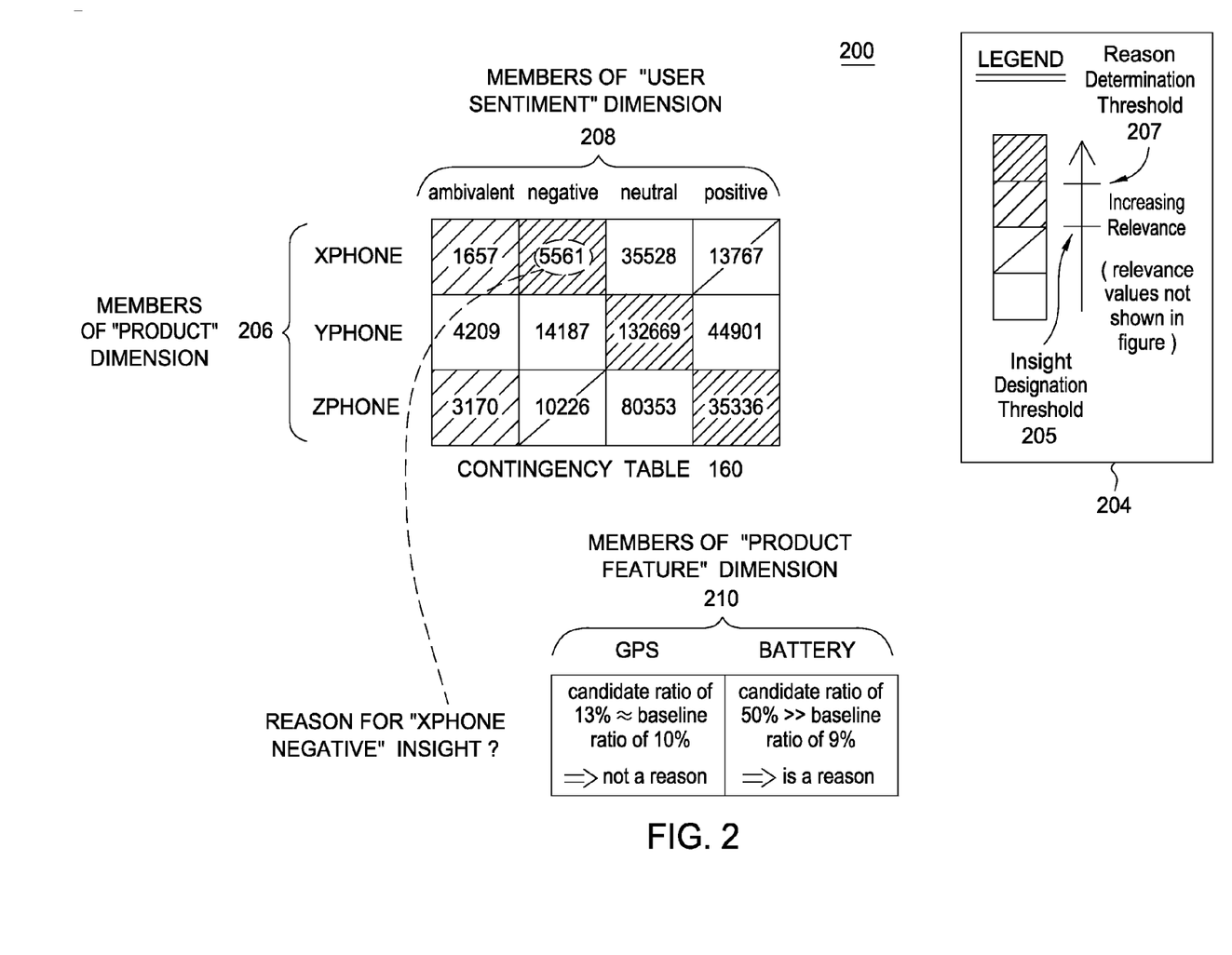
FIG. 2 illustrates a contingency table and associated determinations by an analytic application, according to one embodiment presented in this disclosure.

FIG. 2 illustrates an example 200 of the contingency table 160 and associated determinations by the application 150 of FIG. 1, according to one embodiment presented in this disclosure. The contingency table 160 is generated for members from multiple dimensions, based on a set of data snippets 158 reflecting dimensions of the multi-dimensional data 156. Each of the snippets individually reflects zero or more of the dimensions. In one embodiment, the set of data snippets 158 may be generated by processing unstructured data into semi-structured data. In one embodiment, unstructured data includes user-generated textual content such as user posts on forums, social networking applications, blogs, micro-blogs, e-commerce sites, newsgroups, etc. In some embodiments, the unstructured data further includes emails and/or call center transcripts. At least in some embodiments, the unstructured data may be accompanied by structured metadata, e.g., an author name, a date and time of the post, etc. Such structured metadata may constitute additional dimensions of the data snippets. In some embodiments, such as, without limitation, e-commerce sites, the unstructured data may include product names, product features, and sentiment about a product or features thereof, which may convey reasons why a given product or feature is deemed desirable (or undesirable). Additionally or alternatively, the unstructured data may include warranty information, insurance claim information, and/or error information, e.g., error codes, problem causes, etc.

In one embodiment, the unstructured data is provided by a web crawler, a third party content provider application programming interface (API), a database serving the unstructured data, or a content management system (CMS) serving the unstructured data. To process unstructured data into semi-structured data, the application 150 uses any predefined text analysis technique, such as techniques based on linguistic rules or techniques based on machine learning. To process the unstructured data, content retrieval followed by content analysis may be performed. In one embodiment, during content retrieval, a predefined component calls a third party content web service via hypertext transfer protocol (HTTP) and using a keyword query and retrieves matching social media documents—optionally including structured metadata, such as author names—from the web service. During content analysis, product and feature names are extracted by applying regular expressions to the retrieved text. Sentiment may be detected via a combination of lists of positive terms and negative terms, in conjunction with linguistic processing rules that determine an overall sentiment based on identified sentiment terms. At least in some embodiments, negations accompanying sentiment terms are detected and accounted for during content analysis.

At least in some embodiments, the application 150 is also configured to determine and explain insights gleaned from structured data, in which case one or more steps of processing unstructured data into semi-structured data is omitted. To this end, the application 150 may perform, using the structured data, the steps described herein in conjunction with semi-structured data, in order to determine one or more insights and/or reasons.

The contingency table 160 is presented, without limitation, as follows in the context of social media. As shown, the members include members 206 of the "product" dimension and members 208 of the "user sentiment" dimension. The members 206 of the product dimension include smartphones "xphone", "yphone", and "zphone". The members 208 of the user sentiment dimension include "ambivalent", "negative", "neutral", and "positive". Each cell in the table includes a frequency property characterizing a frequency of occurrences of the members uniquely identifying the respective cell, in the set of data snippets. Depending on the embodiment, the frequency may specify the total count of occurrences of the members, independent of context—or, alternatively, the count of data snippets (or any other predefined unit of data, such as a document or data entry) containing at least one occurrence of the members. Although the cells in the contingency table are described as being qualified by two dimensions, cells that are qualified by more than two dimensions are broadly contemplated. Further, each cell may have an associated relevance property determined based on a statistical test, such as a chi-square component test, a Fisher-Yates test, or a predefined combination thereof. In one embodiment, each statistical test has associated statistical requirements, and the application 150 selects a statistical test based on which statistical requirements are fulfilled by the data.

For brevity, the relevance properties are not shown in FIG. 2; instead, the cells of the contingency table are shaded to indicate the magnitudes of the relevance properties and in accordance with a legend 204. The legend 204 includes an insight designation threshold 205 and a reason determination threshold 207, where the reason determination threshold 207 is higher than the insight designation threshold 205. In other embodiments, the reason determination threshold and the insight designation threshold are the same. In one embodiment, the application 150 designates only those cells having a relevance property exceeding the insight threshold, as insights. Additionally or alternatively, the application 150 performs reason determination only for those insights having a relevance property exceeding the reason determination threshold 207. Doing so may improve the efficiency of the application 150 at least in some cases. Each cell evaluated by the application against the insight designation threshold and/or the reason determination threshold 207 may also be referred to herein as a "candidate insight". The insight designation threshold 205 and/or the reason determination threshold 207 may be tailored to suit the needs of a particular case. For example, in an alternative embodiment, the reason determination threshold 207 is the same as the insight designation threshold 205.

As shown, the cell representing the member combination of "xphone negative" satisfies both the insight designation threshold 205 and the reason determination threshold 207. In some cases, this may result from the social media containing many user complaints about one or more specific features of xphones. Accordingly, the application 150 designates the "xphone negative" cell as an insight and determines one or more reasons underlying the insight—e.g., the one or more specific features prompting the negative user sentiment in the first place. In doing so, the application 150 further takes into account whether a given feature under consideration prompts negative user sentiment for xphones specifically or prompts negative user sentiment across multiple (or even all) smartphones generally. That the given feature prompts negative user sentiment for xphones specifically (and not for other smartphones) results in a higher likelihood of the given feature being designated by the application 150 as a reason underlying the "xphone negative" insight.

On the other hand, the cell representing the member combination of "zphone ambivalent" satisfies the insight designation threshold 205 but not the reason determination threshold 207. Accordingly, the application 150 designates the "zphone ambivalent" cell as an insight but does not perform reason determination for the insight. Further, the cell representing the member combination of "yphone negative" satisfies neither the insight designation threshold 205 nor the reason determination threshold 207. Accordingly, the application 150 does not designate the "yphone negative" cell as an insight and does not perform reason determination for the cell.

In one embodiment, in order to perform reason determination for the "xphone negative" insight, the application 150 evaluates one or more members from one or more dimensions other than the "product" and "user sentiment" dimensions. For example, the application 150 may evaluate members 210 of the "product feature" dimension, including "GPS" and "battery". Each evaluated member may also be referred to herein as a "candidate reason". For each member under evaluation, the application 150 determines a baseline ratio and a candidate ratio. The baseline ratio is determined by calculating the ratio of the respective member across the set of data snippets—e.g., across all smartphones and user sentiments. In alternative embodiments, the baseline ratio is only calculated across only a subset of the data snippets, such as when the contingency table has been analyzed for insights pertaining to two or more dimensions but only for a specific member of another dimension. As an example, suppose the user specifies to analyze only snippets of a specific year. In this case, the contingency table is generated based on those snippets satisfying the specified criterion—e.g., pertaining to the specific year. In this scenario, the baseline ratio is determined by calculating the ratio of the respective member across the subset of data snippets that pertain to the specific year. Such filtering for a specific contingency table—and, thus, for all reasons—can be done by applying any filter on the data; but the filter may typically restrict one or more dimensions in that members of those dimensions are to satisfy a specified criterion.

In one embodiment, the candidate ratio is determined by calculating the ratio of the respective member across only those data snippets already discussing the member combination of the given feature—e.g., only those data snippets already discussing xphones with a negative user sentiment. Depending on the embodiment, the baseline and/or candidate ratios may be expressed as a fraction or as a percentage.

In one embodiment, the application 150 then determines whether the baseline and candidate ratios satisfy a reason designation criterion, also referred to herein as a reason criterion. The reason criterion takes into account a directional property of the insight, which specifies whether it is the insight occurring more frequently or less frequently than a statistically expected frequency for the insight, that causes the insight to be deemed relevant. In one embodiment, every cell in the contingency table has a respective frequency property, also referred to herein as an actual frequency. To determine the directional property of a given cell, the application 150 first determines an actual frequency by counting occurrences of the cell. The application 150 then applies a specified statistical test in order to determine an expected frequency of the cell. The statistical test may further be used to determine, based on the actual and expected frequencies and optionally based further on one or more parameters specifically supported by the statistical test, the relevance property for the cell by computing a statistical significance of the cell. The directional property may also be determined based on the difference between the actual and expected frequencies. Cells that have a smaller frequency than is statistically expected have a negative direction, and vice versa. For brevity, directional properties are not shown in FIG. 2. If the directional property is positive, then the reason criterion is satisfied if the candidate ratio is greater than the baseline ratio by at least a threshold magnitude. On the other hand, if the directional property is negative, then the reason criterion is satisfied if the candidate ratio is less than the baseline ratio by at least the threshold magnitude. If the reason candidate—e.g., the member under evaluation—satisfies the reason designation criterion, then the application 150 designates the reason candidate as the reason for the given insight, e.g., "xphone negative". The threshold magnitude may be tailored to suit the needs of a particular case.

Assume that the cell under evaluation has a positive directional property and that the threshold magnitude is 30%. As shown, the candidate ratio of "GPS", expressed as a percentage, is 13%, which is only 3% higher than the baseline ratio of "GPS" of 10%. In other words, the member "GPS" is mentioned in 13% of "xphone negative" data snippets and in 10% of data snippets overall (or of those data snippets satisfying previously applied filters, as described above). Given the positive directional property and because the difference of 3% is less than the threshold magnitude of 30%, the reason designation criterion is not satisfied. Depending on the embodiment, the application 150 may then either refrain from designating "GPS" as a reason for the "xphone negative" insight—or affirmatively designate "GPS" as not being a reason for "xphone negative" insight.

Further, the candidate ratio of "battery" is 50%, which is 41% higher than the baseline ratio of "battery" of 9%. In other words, the member "battery" is mentioned in 50% of "xphone negative" data snippets and in 9% of data snippets overall (or of those data snippets satisfying previously applied filters). Given the positive directional property and because the difference of 41% is greater than the threshold magnitude of 30%, the reason designation criterion is satisfied, and the application 150 designates "battery" as a reason for the "xphone negative" insight. The process described above may be repeated to determine multiple reasons for multiple insights gleaned from the data snippets. The application 150 may also output the insights and/or accompanying reasons to a user of the application, such as a business analyst. In some embodiments, the application 150 only outputs a subset of the insights and/or accompanying reasons satisfying an output criterion. The output criterion may be specified by a predefined ranking algorithm or filter algorithm. For example, a given user of the application 150 may customize preferences associated with a ranking algorithm or filter algorithm in order to reflect that a specific set of members and/or dimensions are of particular interest to the user. Further, in some embodiments, the application 150 takes into account a predefined priority list of members and/or dimensions to reduce the evaluation space associated with reason determination. Doing so may improve the efficiency of the application 150 at least in some cases.

For example, in one embodiment, the available, potential reason-dimensions for a specific contingency table are restricted based on user input. For instance, a business analyst may specify, for a contingency table displaying a product dimension versus a sentiment dimension, to identify reasons for insight in the product-feature dimension. In this scenario, the business analyst would restrict the potential reason-dimensions to only features for this specific contingency table. Further, in cases where the underlying data snippets used in building the contingency table are restricted, e.g., to a specified year, then only such is also valid for all reasons—e.g., the data snippets used in generating the contingency table are the same as those used in reason determination.

Figure 3:
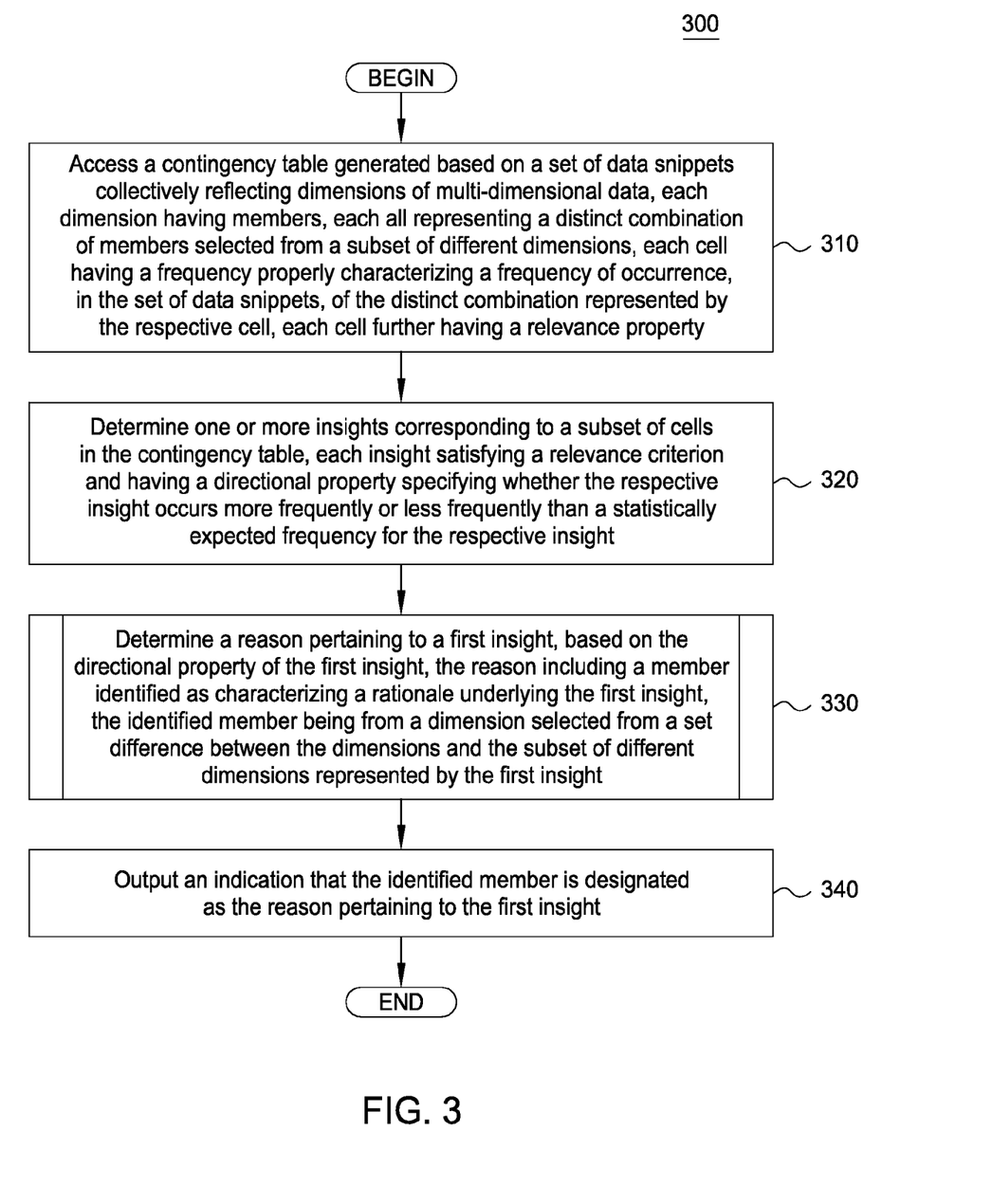
FIG. 3 is a flowchart depicting a method for determining insights gleaned from multi-dimensional data, according to one embodiment presented in this disclosure.

FIG. 3 is a flowchart depicting a method 300 for determining insights gleaned from multi-dimensional data, according to one embodiment presented in this disclosure. As shown, the method 300 begins at step 310, where the application 150 accesses a contingency table generated based on a set of data snippets collectively reflecting dimensions of multi-dimensional data. In one embodiment, each dimension has multiple members, and each cell represents a distinct combination of members selected from a subset of different dimensions. Each member in the combination is from a different dimension. Further, in one embodiment, each cell has a frequency property characterizing a frequency of occurrence, in the set of data snippets, of the distinct combination represented by the respective cell. Further still, in one embodiment, each cell further has a relevance property that may be determined by one or more predefined statistical tests, such as a chi-square component test and a Fisher-Yates test.

At step 320, the application 150 determines one or more insights corresponding to a subset of cells in the contingency table. In one embodiment, each insight satisfies a relevance criterion and has a directional property specifying whether the respective insight occurs more frequently or less frequently than a statistically expected frequency for the respective insight. At step 330, the application 150 determines a reason pertaining to a first insight, based on the directional property of the first insight. In one embodiment, the reason is a member identified as characterizing a rationale underlying the first insight. The identified member is from a dimension selected from a set difference between the dimensions and the subset of different dimensions represented by the first insight. In other words, the identified member is from a dimension other than the ones represented by the first insight. The step 330 is further described below in conjunction with FIG. 4. At step 340, the application 150 outputs an indication that the identified member is designated as the reason pertaining to the first insight. In other embodiments, multiple distinct reasons may be designated for the first insight, including the identified member. After the step 340, the method 300 terminates. In alternative embodiments, only a subset of the steps are performed by the application 150. For example, in one alternative embodiment, only steps 320 and 330 are performed by the application 150, whereas the steps 310 and/or 340 may be performed by an application other than the application 150.

Figure 4:
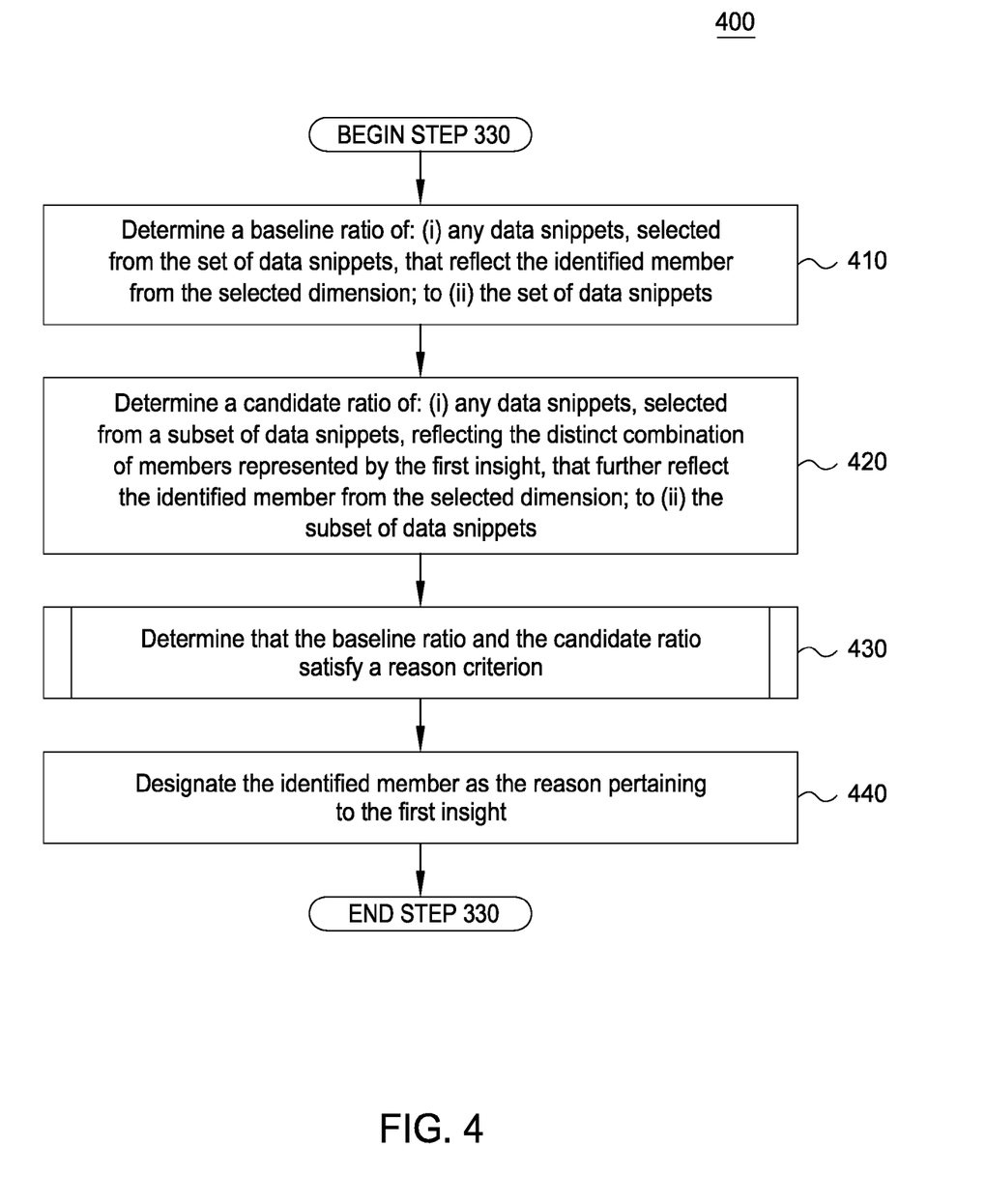
FIG. 4 is a flowchart depicting a method for determining a reason underlying a determined insight, according to one embodiment presented in this disclosure.

FIG. 4 is a flowchart depicting a method 400 for determining the reason pertaining to the first insight, according to one embodiment presented in this disclosure. The method 400 corresponds to the step 330 of FIG. 3. As shown, the method 400 begins at step 410, where the application 150 determines a baseline ratio of: (i) any data snippets, selected from the set of data snippets, that reflect the identified member from the selected dimension; to (ii) the set of data snippets. At step 420, the application 150 determines a candidate ratio of: (i) any data snippets, selected from a subset of data snippets reflecting the distinct combination of members represented by the first insight, that further reflect the identified member from the selected dimension; to (ii) the subset of data snippets. At step 430, the application 150 determines that the baseline ratio and the candidate ratio satisfy a reason criterion. The step 430 is further described below in conjunction with FIG. 5. At step 440, the application 150 designates the identified member as the reason pertaining to the first insight. After the step 440, the method 400 terminates.

Figure 5:
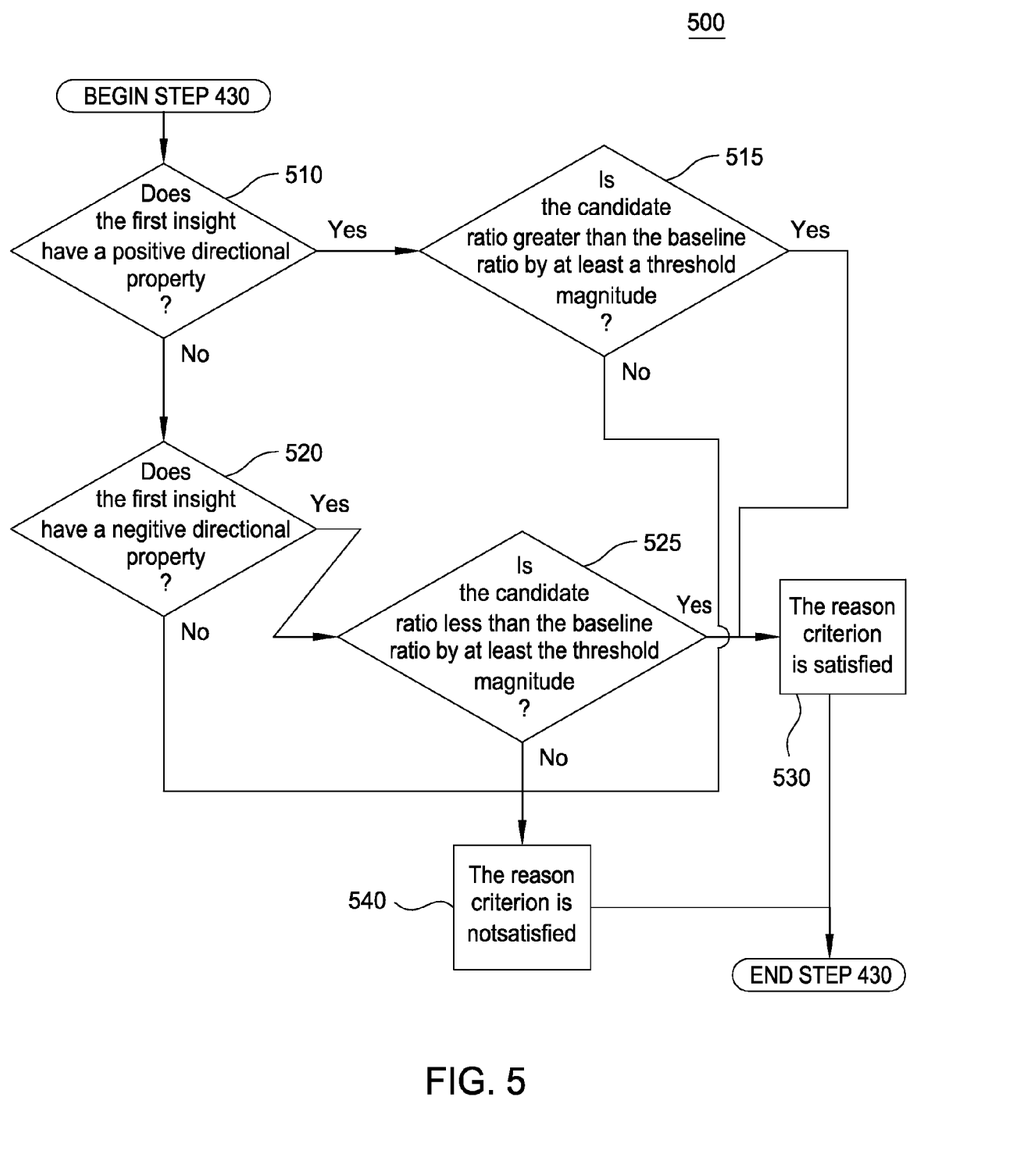
FIG. 5 is a flowchart depicting a method for determining that an identified member, being evaluated as a reason candidate, satisfies a reason criterion, according to one embodiment presented in this disclosure.

FIG. 5 is a flowchart depicting a method 500 for determining that the identified member satisfies a reason criterion, according to one embodiment presented in this disclosure. The method 500 corresponds to the step 430 of FIG. 4. As shown, the method 500 begins at step 510, where the application 150 determines whether the first insight has a positive directional property. In one embodiment, a positive directional property is a directional property specifying that the first insight occurs more frequently than the statistically expected frequency for the first insight. If the first insight has a positive directional property, the application 150 determines whether the candidate ratio is greater than the baseline ratio by at least a threshold magnitude (step 515). If so, the application 150 determines that the reason criterion is satisfied (step 530).

On the other hand, if the first insight does not have a positive direction property (step 510), the application determines whether the first insight has a negative directional property (step 520). In one embodiment, a negative directional property is a directional property specifying that the first insight occurs less frequently than the statistically expected frequency for the first insight. If the first insight has a negative directional property, the application 150 determines whether the candidate ratio is less than the baseline ratio by at least the threshold magnitude (step 525). If so, the application 150 also determines that the reason criterion is satisfied (step 530). Alternatively, if the threshold magnitude is not met (steps 515 or 525), then the application 150 determines that the reason criterion is not satisfied (step 540). After the steps 530 or 540, the method 500 terminates.

Figure 6:
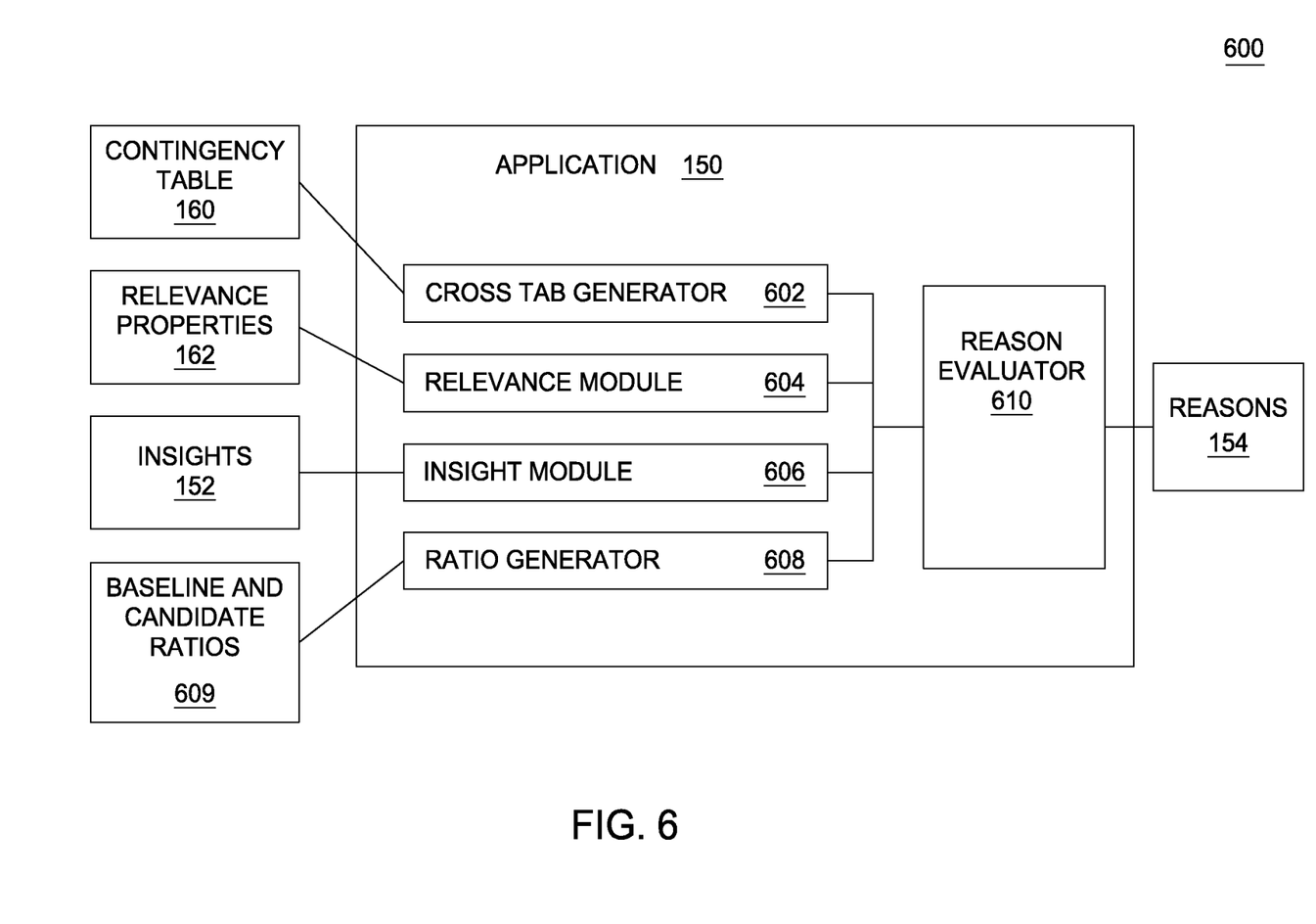
FIG. 6 is a block diagram illustrating components an application for determining and explaining insights gleaned from multi-dimensional data, according to one embodiment presented in this disclosure.

FIG. 6 is a block diagram illustrating components 600 of the application 150 of FIG. 1, according to one embodiment of the invention. Each component 600 may be uniquely identifiable by a respective component name. As shown, the components 600 include a cross tab generator 602, a relevance module 604, an insight module 606, a ratio generator 608, and a reason evaluator 610. In one embodiment, the cross tab generator 602 generates the contingency table 160 based on a set of data snippets reflecting dimensions of the multi-dimensional data. The relevant module 604 generates the relevance properties 162 for the contingency table 160. The insight module 606 identifies one or more insights 152 from the contingency table 160 and based on the relevance properties 162.

For a given one of the insights 152, the ratio generator 608 generates—for each reason candidate from a dimension other than the reflected dimensions—baseline and candidate ratios 609. The reason evaluator 610 evaluates each reason candidate based on the baseline and candidate ratios 609 of the respective candidate, in order to designate a subset of the reason candidates as the reasons 154 for the given one of the insights 152. The operations of the components 600 described above may be repeated in whole or in part, to identify reasons for the remainder of the one or more insights 152.

Other embodiments are broadly contemplated. For example, in some embodiments, the application 150 may also generate the contingency table based on the set of data snippets, including determining the frequency property specified in each cell of the contingency table. Additionally or alternatively, the application 150 may determine, based on one or more statistical tests, a relevance property of each cell in the contingency table. In one embodiment, the application 150 is an analytic application, such as a social media analytic application. The multi-dimensional data may include user-generated social media content, and each data snippet may be a user posting of social media content. Depending on the embodiment, each candidate ratio and/or baseline ratio may be expressed as a fraction or as a percentage. The frequency property, the relevance property, and the directional property of each cell in the contingency table may be distinct properties. Further, one or more of the steps of the application 150 may be performed without requiring any user intervention. For example, depending on the embodiment, the application 150 determines insights and/or underlying reasons, determines relevance properties and/or determines frequency properties without requiring user intervention. The application 150 may also determine the statistically expected frequency for the first insight without requiring user intervention.

Further, the application 150 may independently determine relevance properties based on each individual statistical test, such as a chi-square component test and a Fisher-Yates test. The application 150 may also independently generate the contingency table based further on each individual input type. One input type includes user input provided by a domain expert, the user input specifying which dimensions and/or members to use in generating the contingency table. Another input type includes a programmatically determined priority list of dimensions and members to use in generating the contingency table. In some embodiments, the application 150 may generate the priority list based on a predefined set of member/dimension identification rules. The application 150 may rank candidate insights based on the relevance properties of the candidate insights. The ranking of candidate insights may be used as a basis to refrain from designating and/or outputting one or more candidate insights as actual insights.

Further still, the application 150 may identify candidate reasons pertaining to the first insight, based at least in part on user input specifying eligible members and/or dimensions from the set difference, including: (i) a first set of eligible members and/or dimensions pertaining to a first candidate reason and (ii) a second set of eligible members and/or dimensions pertaining to a second candidate reason different from the first candidate reason. The first and second sets of eligible members may be distinct. The application 150 may determine a baseline ratio and a candidate ratio for each candidate reason. The application 150 may rank the candidate reasons based on the reason criterion. The ranking of candidate reasons may be used as a basis to refrain from designating and/or outputting one or more candidate reasons as actual reasons.

Embodiments presented in the disclosure provide techniques for determining reasons underlying insights gleaned from multi-dimensional data. One embodiment provides an application configured to access a contingency table representing multiple dimensions of the data, in order to identify one or more insights. The application evaluates members of one or more dimensions, other than the represented dimensions, to identify one or more reasons underlying a first insight of the one or more insights. The application outputs the one or more reasons underlying the first insight. At least in some embodiments, the application may be dynamically configured to take into account (or disregard) specific members and/or dimensions of the data. Thus, insights and underlying reasons may be identified without first requiring a complete analysis of the data, including all of the dimensions. To improve plausibility of assertions pertaining to reasons and/or insights, a directional property of the reasons and/or insights may be taken into account by the application. In some embodiments, a domain expert may specify a restricted set of members and/or dimensions for reason determination, in which case the application restricts processing to those specified members and/or dimensions. The application may also perform multiple evaluation runs, each run depending on results from a previous run. Accordingly, insights and underlying reasons may be determined more accurately, efficiently, and/or flexibly at least in some cases.

While the foregoing is directed to embodiments of the present invention, other and further embodiments of the invention may be devised without departing from the basic scope thereof, and the scope thereof is determined by the claims that follow.

What is claimed is:

1. A computer-implemented method of reason determination for insights gleaned from multi-dimensional data, based on directional properties of the insights, the computer-implemented method comprising:
   determining one or more insights comprising a subset of cells in a contingency table, each of the one or more insights satisfying a relevance criterion and having an associated directional property specifying whether the respective insight occurs more frequently or less frequently than a statistically expected frequency for the respective insight, wherein satisfying the relevance criterion comprises satisfying a threshold deviation from the statistically expected frequency for the respective insight; and
   determining, by operation of one or more computer processors and based on the directional property of a first insight of the one or more insights, a reason pertaining to the first insight, the reason comprising a member that is identified as characterizing a rationale underlying the first insight, wherein determining the reason pertaining to the first insight comprises, upon determining that a baseline ratio and a candidate ratio satisfy a reason criterion, designating the identified member from the selected dimension, as the reason pertaining to the first insight, wherein an indication is output that the identified member is designated as the reason pertaining to the first insight;
   wherein the reason criterion is satisfied upon at least one of a first condition and a second condition; the first condition comprising: (i) the first insight having a positive directional property; and (ii) the candidate ratio being greater than the baseline ratio by at least a threshold magnitude; the second condition comprising: (i) the first insight having a negative directional property; and (ii) the candidate ratio being less than the baseline ratio by at least the threshold magnitude.

2. The computer-implemented method of claim 1, further comprising:
   accessing the contingency table generated based on a set of data snippets collectively reflecting a plurality of dimensions of multi-dimensional data, wherein the contingency table comprises a plurality of cells, each of the plurality of dimensions having a plurality of members, each of the plurality of cells representing a distinct combination of members selected from a subset of different dimensions of the plurality of dimensions, each of the plurality of cells having a frequency property characterizing a frequency of occurrence, in the set of data snippets, of the distinct combination represented by the respective cell, each of the plurality of cells further having an associated relevance property;
   wherein the identified member is from a dimension selected from a set difference between the plurality of dimensions and the subset of different dimensions represented by the first insight.

3. The computer-implemented method of claim 2, wherein the distinct combination of members represented by the first insight is reflected by a subset of the set of data snippets, wherein determining the reason pertaining to the first insight further comprises:
   determining the baseline ratio, which comprises a ratio of: (i) any data snippets, selected from the set of data snippets, that reflect the identified member from the selected dimension; to (ii) the set of data snippets; and
   determining the candidate ratio, which comprises a ratio of: (i) any data snippets, selected from the subset of data snippets, that further reflect the identified member; to (ii) the subset of data snippets.

4. The computer-implemented method of claim 3, wherein having a positive directional property comprises the directional property of the first insight specifying that the first insight occurs more frequently than the statistically expected frequency for the first insight;
   wherein having a negative directional property comprises the directional property of the first insight specifying that the first insight occurs less frequently than the statistically expected frequency for the first insight.

5. The computer-implemented method of claim 4, wherein each member in each distinct combination of members represented by the plurality of cells is from a different dimension, wherein the computer-implemented method further comprises:
   generating the contingency table based on the set of data snippets, including determining the frequency property specified in each cell of the contingency table; and
   determining, based on one or more statistical tests, a relevance property of each cell in the contingency table.

6. The computer-implemented method of claim 5, wherein the reason pertaining to the first insight is determined by an analytic application, wherein the analytic application is configured to determine a relevance property based individually on each statistical test selected from: (i) a chi-square component test and (ii) a Fisher-Yates test;
   wherein the analytic application is further configured to independently generate the contingency table based further on each individual input selected from: (i) user input provided by a domain expert, the user input specifying which dimensions and members to use in generating the contingency table; and (ii) a programmatically determined priority list of dimensions and members to use in generating the contingency table;
   wherein the analytic application is further configured to rank a plurality of candidate insights based on the relevance properties of the plurality of candidate insights, wherein only a subset of the plurality of candidate insights, excluding at least one candidate insight, is designated as one or more insights and output, based on the ranking of the plurality of candidate insights.

7. The computer-implemented method of claim 6, wherein the analytic application is further configured to:
   identify a plurality of candidate reasons pertaining to the first insight, based on user input specifying eligible members and dimensions from the set difference between the plurality of dimensions and the subset of different dimensions, including a first set of eligible members and dimensions pertaining to a first of the plurality of candidate reasons and a second set of eligible members and dimensions pertaining to a second of the plurality of candidate reasons, wherein the first and second sets of eligible members and dimensions are distinct;

determine a baseline ratio and a candidate ratio for each candidate reason of the plurality of candidate reasons; and rank the plurality of candidate reasons based on the reason criterion, wherein only a subset of the plurality of candidate reasons, excluding at least one candidate reason, is designated as one or more reasons and output, based on the ranking of the plurality of candidate reasons.

8. The computer-implemented method of claim 7, wherein the reason pertaining to the first insight is determined without requiring user intervention, wherein the one or more insights are determined without requiring user intervention, wherein the relevance property of each cell in the contingency table is generated without requiring user intervention, wherein the contingency table is generated without requiring user intervention, wherein the frequency property, the relevance property, and the directional property of each cell in the contingency table are distinct properties.

9. The computer-implemented method of claim 8, wherein the analytic application is further configured to designate a plurality of distinct reasons pertaining to the first insight, the plurality of distinct reasons including the reason pertaining to the first insight;

wherein the analytic application is further configured to determine a statistically expected frequency for the first insight without requiring user intervention;

wherein the analytic application is further configured to perform reason determination only for insights having a relevance property exceeding a reason determination threshold, wherein no reason determination is performed for at least one insight having a relevance property not exceeding the reason determination threshold.

10. The computer-implemented method of claim 9, wherein the analytic application is further configured to determine each frequency selected from: (i) a count of occurrences independent of units of content and (ii) a count of units of content having one or more occurrences;

wherein the analytic application is further configured to express each of the baseline ratio and the candidate ratio as a percentage;

wherein the analytic application comprises a social media analytic application, wherein the multi-dimensional data comprises user-generated social media content, wherein each data snippet comprises a user posting of social media content.

11. The computer-implemented method of claim 1, wherein having a positive directional property comprises the directional property of the first insight specifying that the first insight occurs more frequently than the statistically expected frequency for the first insight.

12. The computer-implemented method of claim 1, wherein having a negative directional property comprises the directional property of the first insight specifying that the first insight occurs less frequently than the statistically expected frequency for the first insight.

13. The computer-implemented method of claim 1, wherein determining the reason pertaining to the first insight further comprises:

determining the baseline ratio, which comprises a ratio of: (i) any data snippets, selected from the set of data snippets, that reflect the identified member from the selected dimension; to (ii) the set of data snippets.

14. The computer-implemented method of claim 1, wherein determining the reason pertaining to the first insight further comprises:

determining the candidate ratio, which comprises a ratio of: (i) any data snippets, selected from the subset of data snippets, that further reflect the identified member; to (ii) the subset of data snippets.

15. The computer-implemented method of claim 1, wherein the reason pertaining to the first insight is determined by an analytic application.

16. The computer-implemented method of claim 1, wherein the reason pertaining to the first insight is determined without requiring user intervention.

17. The computer-implemented method of claim 1, wherein the one or more insights are determined without requiring user intervention.

18. The computer-implemented method of claim 1, wherein at least one relevance property in the contingency table is generated without requiring user intervention.

19. The computer-implemented method of claim 1, wherein a plurality of distinct reasons pertaining to the first insight, including the reason, is designated.

20. The computer-implemented method of claim 1, wherein the multi-dimensional data comprises user-generated social media content.

* * * * *